Sept. 5, 1944.　　　J. W. ARMBRUSTER　　　2,357,444
STATISTICAL RECORD
Filed Dec. 31, 1941
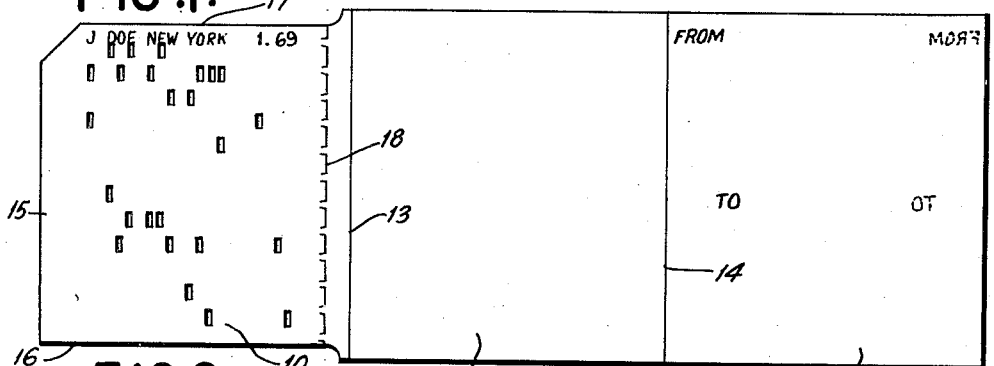
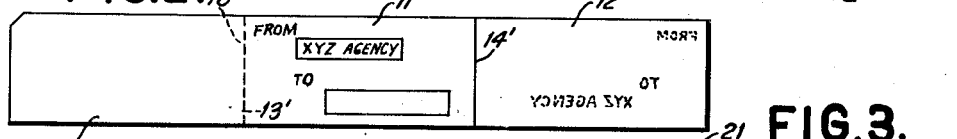
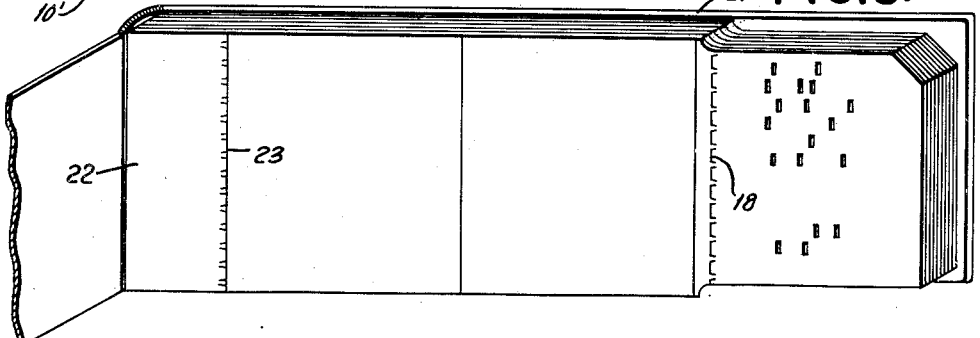
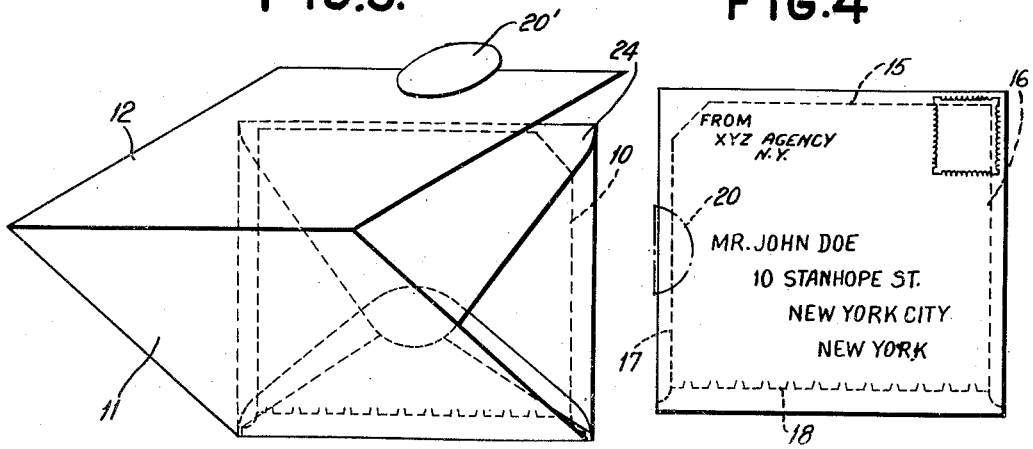
BY
ATTORNEY Patented Sept. 5, 1944

2,357,444

UNITED STATES PATENT OFFICE 2,357,444

STATISTICAL RECORD

John W. Armbruster, East Rockaway, N. Y., assignor to International Business Machines Corporation, New York, N. Y., a corporation of New York Application December 31, 1941, Serial No. 425,142

3 Claims. (Cl. 229—92.1)

This invention relates generally to record material designed to be protected when handled and more particularly to the formation of tabulating cards so that they may be sent through the mails for minimum postage and still have the critical card faces and edges protected.

The records or cards used to control tabulators and similar machines are cut with truly aligned edges and accurately dimensioned lengths and widths. After the cars are made, it is important that they should be protected from cuts and foreign matter which would be detected by the sensitive analyzing devices of a tabulator and cause errors. It is also important that the faces and edges of the card be maintained smooth and straight because the card feeding devices are unable to function properly, if the cards are bent or the edges spread by impact against hard objects. Therefore, should an ordinary Hollerith card be sent through the mails unprotected, it is likely that it would be damaged in transit. Heretofore, it was necessary to put cards to be mailed in an envelope for protection at a first class mailing cost.

It is an object of the present invention to proportion and arrange a record card so that it may be folded to protect itself and pass through the mails at low cost.

It is assumed that the cards would be used by banks, loan agencies or insurance companies and mailed out regularly to call for return with check or cash for instalment or premium payment. In such use, the outer folds conceal the record data and hold confidential the loan or insurance transaction. Uses other than those mentioned are evidently possible.

Another object of the invention is to crease a length of card stock to form three portions, one of which is to be a tabulating card which is folded within the other two portions for protection in handling or mailing. The card portion can be of the same size as the outer folds or smaller in size to be well within the protecting edges of the outer folds.

A further object of the invention is to provide a perforated tearing line for separating the main part of the card portion, i. e. the indicia carrying part of the inner fold, from the other protecting folds which are discarded. Then, the indicia perforations of the card portion can be used in the usual way to control a tabulating machine.

An object of the invention is the provision of a book of mailable tabulating cards, said cards having a double tearing line, the one tearing line serving to aid detachment of the three-folded card from the book and the other tearing line serving later to detach the inner fold for use in an accounting machine after receipt in the mail.

Another object of the invention is the provision of a double set of "From" and "To" blocks on the outer fold of a three folded card, whereby the two outer folds may be reversed about the inner fold to reveal two different sets of addresses so that the same replay mail card can be used for returning or forward mailing. The two sets of addresses can also be placed on opposite sides of the two outer folds, one fold being used in one mailing operation and the other fold being used in a second mailing operation.

Another object of the invention is the provision of a reply mail package comprising an envelope and a folded card, said envelope being proportioned to fit over one of the three folds of said card. The envelope is assembled over the inner fold and the two other folds are brought around the envelope. Thus, the tabulating card portion, which is the inner fold, has the double protection provided by the envelope and the outer folds of the same card. After receipt of such a package, the outer folds may be torn off and discarded and the inner tabulating card portion returned in the envelope for accounting purposes.

Other objects of the invention will be pointed out in the following description and claims and illustrated in the accompanying drawing, which discloses, by way of example, the principle of the invention and the best mode, which has been contemplated, of applying that principle.

In the drawing:

Fig. 1 is a view showing a mailing card divided into three folding portions, one of which carries a stub card adapted for use in controlling tabulating machines.

Fig. 2 is a view showing a mailing card with a full sized Hollerith tabulating card attached to two protecting folds.

Fig. 3 shows a book containing a plurality of cards, such as that shown in Fig. 1. These cards are provided with an extra tearing line so that they may be detached separately from the book.

Fig. 4 is a view showing a card such as that of Fig. 1 in a folded condition ready for mailing.

Fig. 5 is a perspective view of a partially assembled reply mail package including an envelope and an accounting control card proportioned to be folded around said envelope.

Although the cards of the present invention are illustrated as perforated records of Hollerith type, it is evident that other forms of indicia and other kinds of machine control media may be arranged to follow the teachings of the present invention. The indicia bearing portions of the records are proportioned to control tabulating machines such as that disclosed in Patent 1,976,617.

In Fig. 1 a length of record card stock is seen to be divided into three portions 10, 11 and 12 by a pair of vertical creases 13 and 14. These creases are placed in the card as guides for a folding operation wherein the portion 10 which is to be protected is folded upon portion 11 and then portion 12 is brought over the top of portion 10. The critical edges 15, 16, 17 and 18 of portion 10, which is the indicia carrying part of the record stock, are reduced in size so that they fit within the folds limited by the creases 13 and 14 of the outer edges of the card stock. In Fig. 1 this tabulator control portion 10 is not a full size Hollerith card but is proportioned as a stub card sometimes used in tabulating machines. In Fig. 4 the card is shown in the folded condition with the edges 15, 16, 17 and 18 clearly within the confines and protection of all outer edges of the package ready for mailing at a minimum cost. The folds are held together by a seal 20 or, if it is desired, a postage stamp may be used for the same purpose.

Referring back to Fig. 1, it is noted that edge 18 is part of a line of perforations making the portion 10 readily detachable from the remainder of the card. The perforations or slots along edge 18 are arranged as revealed in Lake Patent 1,760,417. This patent is concerned with the maintenance of a straight edge after the detachment of such an edge from other card stock. It is apparent that the tearing line 18 of Fig. 1 may coincide with and replace the creased line 13 as shown in Fig. 2.

It is assumed that the cards, such as shown in Fig. 1, will be perforated with name, address and amount data before being sent out in the mail, the idea being that the notice calling for payment of an installment or an insurance premium will carry with it an accounting control medium in the form of portion 10 which, when returned, is readily available to record the transaction through the automatic operation of an accounting machine. The folded card is to be mailed out by the bank or insurance company in the form shown in Fig. 4 and then, when it is received by the person to make the payment, he tears off portion 10 and returns it in an envelope with his check. If the payment is to be made in person with cash and the card is to be returned by hand, in all these handling operations the data control portion of the record is protected to a greater extent than it would be without the extra folds attached thereto.

In Fig. 1 the outer fold 12 is seen to carry a double set of "From" and "To" mailing blocks, the one set appearing on the upper face of the portion and the other appearing on the under side as designated by dotted lines in the drawing. These double sets of address blocks are provided for the purpose of return mailing should it be desired that the same card be folded in two directions, in one way for mailing to a customer and then folded by the customer in the other way for return mailing.

Fig. 2 shows a modification of the mailing card shown on Fig. 1. In this latter figure the card portion 10′ is a full sized Hollerith control record, and it is separable from the remainder of the card stock by a tearing edge 18′ similar to the tearing line 18 of Fig. 1. The strip of card stock in Fig. 2 is divided into three equal portions by creases 13′ and 14′ so that portions 11′ and 12′ may be folded around portion 10′. The arrangement of mailing blocks is varied from that shown in Fig. 1 because one set of "From" and "To" designations is shown on the top of portion 11′ while the other set of address blocks is designated as printed on the under side of other fold 12′.

Fig. 3 reveals a book 21 carrying a plurality of cards such as that shown in Fig. 1. These cards in the book differ only in that they are held on a binding portion 22 by a tearing line 23 similar to the tearing line 18 already described. The book 21 may be used to obtain the records relating to the instalment payments concerning one particular line or it may relate to a single insurance policy with the cards representing quarterly or annual premium notices.

There are times when it is well to furnish an envelope to insure the return of a payment in a properly addressed manner. In such cases a package such as that shown in Fig. 5 may be formed with an envelope 24 placed over the portion 10 before the portions 11 and 12 are folded around the envelope in readiness for mailing. The reason for such a package is not only to provide an envelope for return mail purposes but also to provide an additional protecting cover for the critical edges of the tabulator stub card 10. It will be noted that the edges of the card portion 10 are not only protected by the envelope but both the card and the envelope are protected by the extending edges of the outer folds 11 and 12. The different members of the reply package are proportioned so that the envelope is slightly smaller than the outer folds and the indicia carrying card portion is slightly smaller than the envelope.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A reply mail package comprising a folded tabulating accounting card and an envelope, two card folds being discardable and a third separable fold adapted for use as an accounting machine control record, said usable fold of said card projecting into said envelope whereby the usable fold is protected and discardable folds covering said envelope whereby the envelope is protected.

2. A reply mail package comprising an envelope, a seal, and a card which is folded to provide two outer protecting folds and a third inner fold which is smaller than the outer folds, said inner fold being an accounting machine control record the edges of which are to be protected, said envelope being of a size smaller than said outer folds but larger than said third fold over which it is assembled before said outer folds are sealed, whereby the outer folds protect the envelope and both the outer folds and the envelope protect the control record.

3. As an article of manufacture, a rectangular strip of record material, said strip being creased with two lateral lines to divide the strip into three portions, one of which is an indicia carrying portion as an accounting machine control element bearing vertical columns and horizontal rows of data representing indicia and being proportioned narrower and shorter than the other two equal portions, a tearing line of perforations within said indicia portion and parallel with but distinct from said creasing places, all edges of said indicia portion being aligned and spaced accurately with respect to said indicia, said indicia portion being folded within the other two portions, whereby all edges and the tearing line edge of said indicia portion are well within the outer confines of the folded article and protected when the article is handled.

JOHN W. ARMBRUSTER.